(12) United States Patent
Aesaert et al.

(10) Patent No.: US 12,171,164 B2
(45) Date of Patent: Dec. 24, 2024

(54) SYSTEM FOR SETTING PARAMETERS FOR A MULTI-SEGMENT AGRICULTURAL HEADER

(71) Applicant: CNH Industrial America LLC, New Holland, PA (US)

(72) Inventors: Glenn Aesaert, Izegem (BE); Herbert M. Farley, Elizabethtown, PA (US); Cory D. Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 886 days.

(21) Appl. No.: 17/294,104

(22) PCT Filed: Nov. 12, 2019

(86) PCT No.: PCT/US2019/060942
§ 371 (c)(1),
(2) Date: May 14, 2021

(87) PCT Pub. No.: WO2020/102209
PCT Pub. Date: May 22, 2020

(65) Prior Publication Data
US 2022/0015291 A1 Jan. 20, 2022

Related U.S. Application Data

(60) Provisional application No. 62/768,294, filed on Nov. 16, 2018.

(51) Int. Cl.
*A01D 41/14* (2006.01)
*A01D 41/127* (2006.01)
(Continued)

(52) U.S. Cl.
CPC ......... *A01D 41/141* (2013.01); *A01D 41/127* (2013.01); *A01D 41/144* (2013.01);
(Continued)

(58) Field of Classification Search
CPC .. A01D 41/141; A01D 41/127; A01D 41/144; A01D 41/145; A01D 61/008;
(Continued)

(56) References Cited

U.S. PATENT DOCUMENTS 4,487,004 A * 12/1984 Kejr ................... A01D 41/14
56/297
6,061,617 A 5/2000 Berger et al.
(Continued)

FOREIGN PATENT DOCUMENTS

| EP | 2781975 A1 | 9/2014 |
|---|---|---|
| EP | 3087819 A2 | 11/2016 |
| FR | 3027426 A1 | 4/2016 |

OTHER PUBLICATIONS

International Search Report for PCT application PCT/US2019/060942, mailed Mar. 17, 2020 (12 pages).

*Primary Examiner* — Arpad Fabian-Kovacs
(74) *Attorney, Agent, or Firm* — Peter K. Zacharias

(57) ABSTRACT

A work vehicle system includes a work vehicle controller configured to output a control signal indicative of instructions to move a feeder house based at least in part on at least one header parameter. The work vehicle controller is configured to output the control signal to a network. The work vehicle also includes an agricultural header controller configured to receive the control signal and control movement of the feeder house based at least in part on the control signal. Further, the work vehicle includes a wing controller configured to receive the at least one header parameter from the network and output a wing control signal indicative of instructions to move a wing based at least in part on the at least one header parameter. The wing is coupled to a center section.

18 Claims, 5 Drawing Sheets

(51) Int. Cl.
    *A01D 61/00*     (2006.01)
    *A01B 63/00*     (2006.01)
    *A01B 63/10*     (2006.01)
    *A01B 73/04*     (2006.01)
    *F15B 1/033*     (2006.01)
    *F15B 11/16*     (2006.01)

(52) U.S. Cl.
    CPC ......... *A01D 41/145* (2013.01); *A01D 61/008* (2013.01); *A01B 63/008* (2013.01); *A01B 63/10* (2013.01); *A01B 73/044* (2013.01); *F15B 1/033* (2013.01); *F15B 11/16* (2013.01); *F15B 2211/212* (2013.01); *F15B 2211/7052* (2013.01); *F15B 2211/71* (2013.01)

(58) Field of Classification Search
    CPC ..... A01B 63/008; A01B 63/10; A01B 73/044; F15B 1/033; F15B 11/16; F15B 2211/212; F15B 2211/7052; F15B 2211/71

See application file for complete search history.

(56) References Cited

U.S. PATENT DOCUMENTS

| | | | |
|---|---|---|---|
| 6,928,353 B2 | 8/2005 | Finley et al. | |
| 7,360,351 B2 * | 4/2008 | Rickert | A01D 41/144 56/228 |
| 7,487,024 B2 | 2/2009 | Farley et al. | |
| 7,614,206 B2 * | 11/2009 | Tippery | A01D 41/144 56/15.8 |
| 9,439,349 B2 | 9/2016 | Drake et al. | |
| 9,968,033 B2 * | 5/2018 | Dunn | A01B 63/008 |
| 10,568,266 B2 * | 2/2020 | Vandeven | A01D 41/145 |
| 10,820,511 B2 * | 11/2020 | Brimeyer | A01B 63/10 |
| 11,412,661 B2 * | 8/2022 | Hunt | A01D 41/144 |
| 11,510,365 B2 * | 11/2022 | Hunt | G06F 3/0482 |
| 11,758,846 B2 * | 9/2023 | Martin | A01D 41/145 56/10.2 A |
| 2008/0072560 A1 * | 3/2008 | Talbot | A01D 41/14 56/208 |
| 2014/0033670 A1 * | 2/2014 | Cressoni | A01D 45/021 56/104 |
| 2014/0075907 A1 * | 3/2014 | Ritter | A01D 45/021 56/103 |
| 2015/0013795 A1 * | 1/2015 | Ritter | A01D 41/145 137/596.16 |
| 2016/0113200 A1 | 4/2016 | Gofron et al. | |
| 2016/0183461 A1 * | 6/2016 | Neudorf | A01D 41/145 56/158 |
| 2016/0316624 A1 * | 11/2016 | Ritter | A01D 41/127 |
| 2017/0064904 A1 * | 3/2017 | Figgins | A01D 41/141 |
| 2017/0354080 A1 | 12/2017 | Foster et al. | |
| 2018/0093708 A1 | 4/2018 | Soldan | |
| 2018/0368317 A1 * | 12/2018 | Schulze Selting | A01D 41/141 |
| 2019/0230857 A1 * | 8/2019 | Thomson | A01D 41/141 |

* cited by examiner

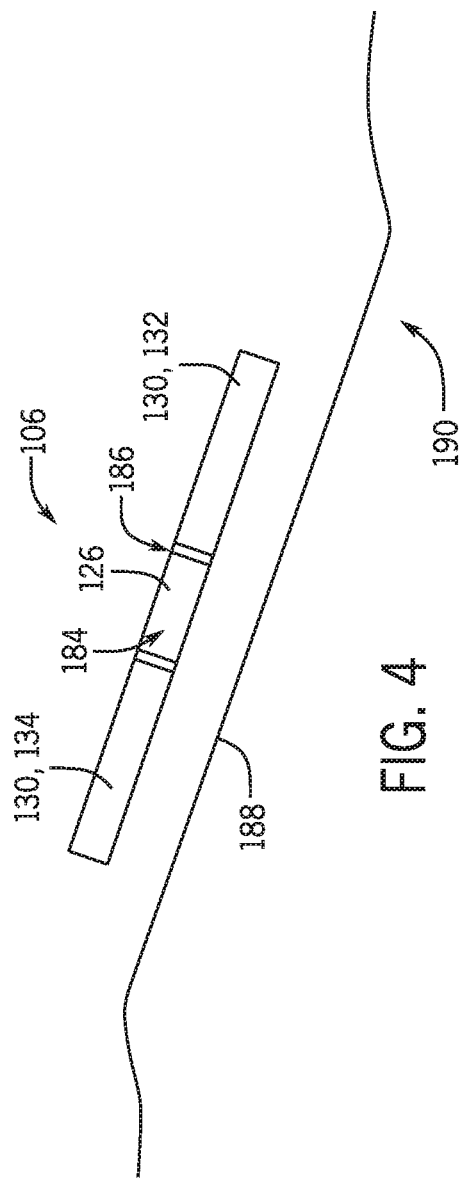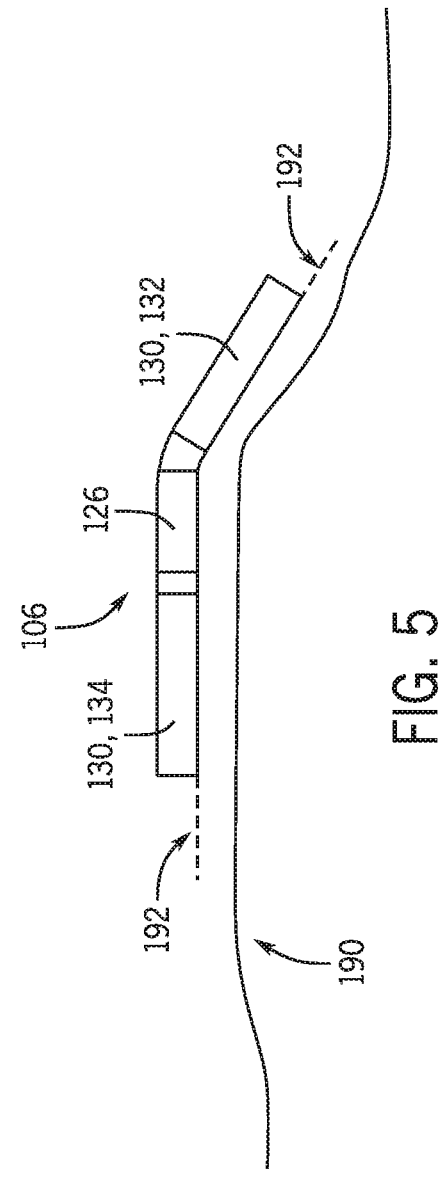

SYSTEM FOR SETTING PARAMETERS FOR A MULTI-SEGMENT AGRICULTURAL HEADER

BACKGROUND

The present disclosure relates generally to setting parameters for a multi-segment agricultural header.

Certain work vehicles (e.g., harvester combines) support an agricultural header (e.g., draper header) configured to harvest agricultural product from a field. For example, the work vehicle may support a draper header. The draper header may have a center intake section and a pair of wings. A cutter bar assembly for cutting agricultural crops extends along a front edge of the draper header. As the cutter bar assembly cuts the agricultural crops, the draper header passes under the cut agricultural crops, the cut agricultural crops fall onto conveyors of the header, and the conveyers direct the cut agricultural crops to an intake of the intake section. Some headers include actuators to raise and lower the wings. For example, on an uneven work surface, controlling a position of each wing of the header may enable the cutter bar assembly to follow the contours of the work surface. Additionally, on a declined portion of the work surface, lowering the wing may increase an amount of cut agricultural crop during the harvesting operation.

The wings may be controlled (e.g., raised or lowered) using wing controllers, which are generally not compatible with systems used by combine harvesters. Thus, a unique user-interface and controller is generally installed into a combine harvester to enable a user to control the wings, which increases the complexity of wiring and installation for agricultural headers.

BRIEF DESCRIPTION

In certain embodiments, an agricultural harvester includes a work vehicle controller configured to output a control signal indicative of instructions to move a feeder house of the agricultural harvester based at least in part on at least one header parameter. The work vehicle controller is configured to output the control signal to a network. The agricultural harvester also includes an agricultural header controller configured to receive the control signal and control movement of the feeder house based at least in part on the control signal to control movement of an agricultural header. Further, the work vehicle includes a wing controller configured to receive the at least one header parameter from the network and output a wing control signal indicative of instructions to move a wing based at least in part on the at least one header parameter. The wing is coupled to the center section of the agricultural header.

DRAWINGS

These and other features, aspects, and advantages of the present disclosure will become better understood when the following detailed description is read with reference to the accompanying drawings in which like characters represent like parts throughout the drawings, wherein:

FIG. 4 is a front view of an embodiment of the agricultural header having a center section, a left wing, and a right wing;

FIG. 5 is a front view of the agricultural header, in which the left wing is lowered.

DETAILED DESCRIPTION

Figure 1:
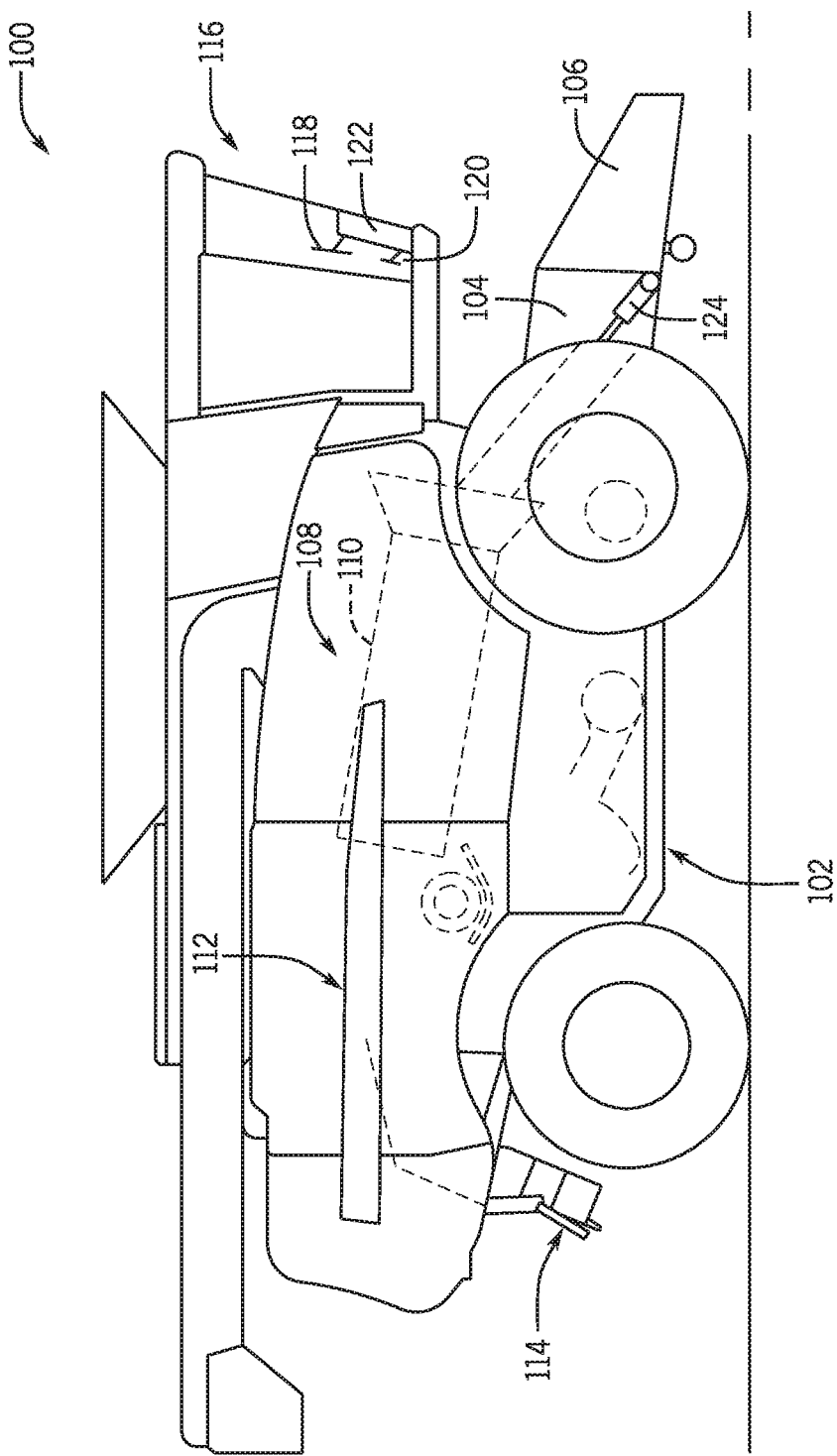
FIG. 1 is a side view of an embodiment of an agricultural harvester.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The process of farming typically begins with planting seeds within a field. Over time, the seeds grow and eventually become harvestable crops. Typically, only a portion of each crop is harvested (e.g., the usable material is separated from the remainder of the crop during the harvesting process). For example, a work vehicle (e.g., harvester) may cut agricultural crops within a field via an agricultural header (e.g., header). The agricultural header may also gather the cut agricultural crops into a processing system of the work vehicle for further processing. The processing system may include a threshing machine configured to thresh the agricultural crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the work vehicle (e.g., via a spreader).

As mentioned above, the agricultural header may cut agricultural crops as part of a harvesting process. To increase yield from a harvest, it may be desirable to cut certain crops at a specific height. Thus, the work vehicle may position the agricultural header at the specific height above the soil surface. However, many fields have uneven terrain, which may cause the agricultural header to be positioned at different heights along a width of the agricultural header. To reduce a variation in agricultural header height along width of the agricultural header, certain agricultural headers include wing portions that may move (e.g., lower, raise) with respect to a center portion of the agricultural header. However, moving the wings may generally increase the complexity of an agricultural header control system. Wing controllers are generally not compatible with systems used by work vehicles (e.g., combine harvesters). Thus, a unique user-interface and controller must generally be installed into a combine harvester so that a user may control wing controllers, which increases the complexity of wiring and installation for agricultural headers. Thus, in accordance with certain embodiments of this disclosure, a system and method for controlling a wing using a single segment combine harvester control system is provided.

Turning now to the drawings, FIG. 1 is a side view of an embodiment of an agricultural harvester. The agricultural harvester includes a work vehicle 100. The work vehicle 100 includes a chassis 102 and a feeder house 104 movably coupled to a front portion of the chassis. The feeder house 104 is configured to move (e.g., upwardly and downwardly) with respect to the chassis 102. Further, the feeder house 104 is coupled to an agricultural header 106 at an end opposite the work vehicle 100. The agricultural header 106 (e.g., draper header) is configured to cut agricultural crops. Cut crops are directed, via the agricultural header 106, toward an inlet of a crop processing system 108 of the work vehicle 100. The crop processing system 108 receives cut crops from the agricultural header 106. In some embodiments, the crop processing system 108 includes a thresher 110 that conveys a flow of cut crops through the crop processing system 108. The thresher 110 may include a cylindrical threshing rotor that transports the crops in a helical flow path. In addition to transporting the crops, the thresher 110 may also separate certain desired crop material (e.g., grain) from residue (e.g., MOG), such as husk and pods, and direct the residue into a cleaning system located beneath the thresher 110. The residue may be transported to a crop residue handling system 112, which may hold the crop residue for further processing and/or expel the crop residue from the work vehicle 100 via a crop residue spreading system 114 positioned at the aft end of the work vehicle 100.

The work vehicle 100 includes a cab 116 for seating a user (e.g., work vehicle driver) during operation of the agricultural harvester. The user may control various parameters of the agricultural harvester 100 via controls disposed in the cab 116. For example, the cab 116 may have a steering wheel 118 configured to control a direction of the work vehicle and/or pedals 120 configured to control a speed of the work vehicle 100. The work vehicle 100 may also include a user interface 122. The user interface 122 may be connected to a CANBUS network of the agricultural harvester. Various component of the agricultural harvester may be connected to the CANBUS network such that the user may input desired parameters for the various components of the agricultural harvester via the user interface 122.

In the illustrated embodiment, the work vehicle 100 includes a feeder house actuator 124 coupled to the feeder house 104. The feeder house actuator 124 may be a hydraulic, pneumatic, or electric actuator. A power source (e.g., fluid source) for the feeder house actuator 124 may be disposed within the work vehicle 100. The feeder house actuator 124 configured to move (e.g., lift, lower, rotate) a center section of the agricultural header 106 with respect to the work vehicle 100 via actuation of the feeder house 104 and in response to a input from a control block. For example, the actuator may be a hydraulic cylinder, and the control block may be a valve block configured to control hydraulic fluid flow from the fluid source to the actuator. Controlling hydraulic fluid flow controls actuation of the hydraulic cylinder.

The actuator may be configured to lift and lower the center section of the agricultural header 106 based at least in part on a control signal from the user interface 122. In some embodiments, an agricultural header controller may control the actuator based on a detected field feature (e.g., rock, high spot, low spot, etc.) in the path of the agricultural harvester. In some embodiments, the actuator is configured to tilt the center section by rotating the feeder house 104 with respect to the work vehicle 100. The agricultural header controller may be configured to control the actuator based on a slope in the path of the agricultural harvester. In a further embodiment, the agricultural header 106 includes an actuator assembly having a lift actuator configured to lift the feeder house 104 and a tilt actuator configured to tilt the feeder house 104.

Figure 2:
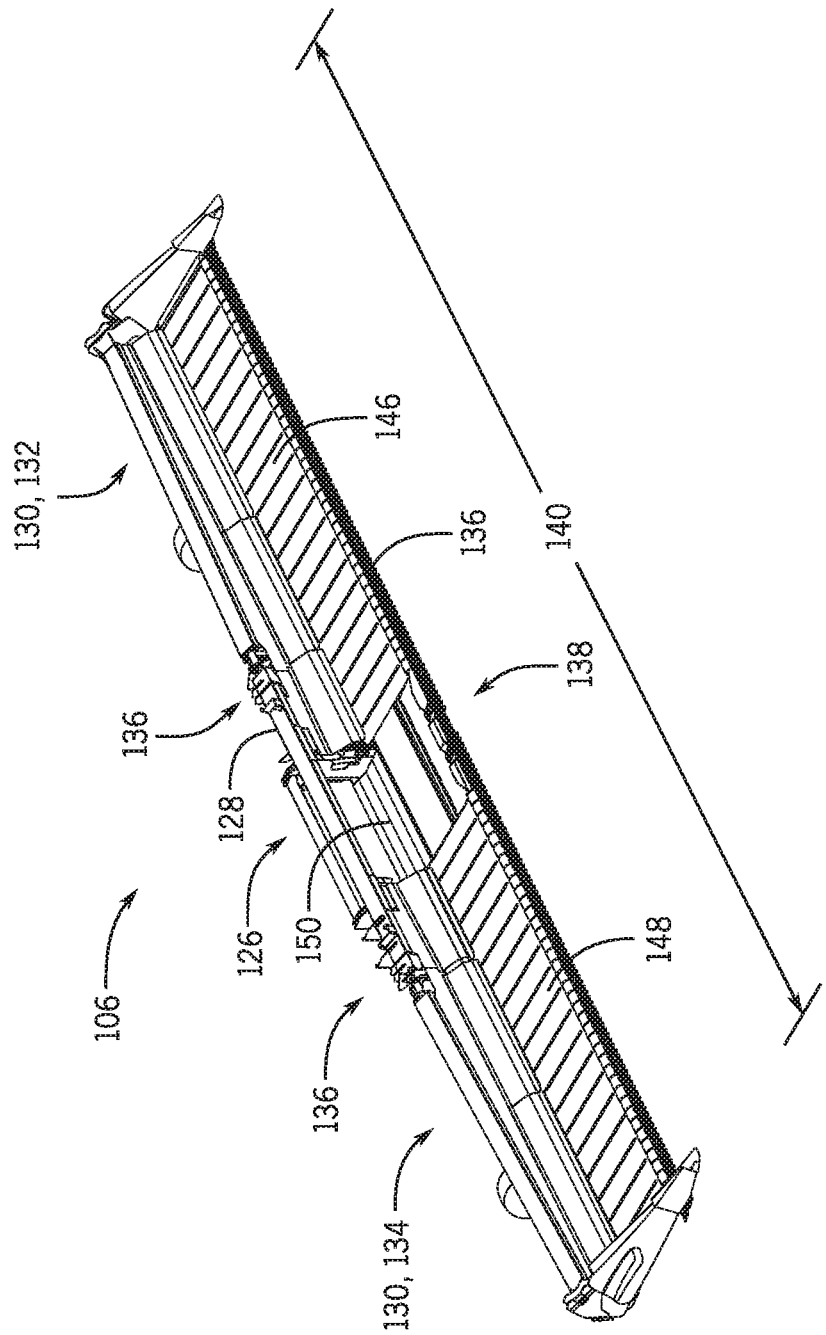
FIG. 2 is a perspective view of an embodiment of an agricultural header that may be employed within the agricultural harvester of FIG. 1.

FIG. 2 is a perspective view of an embodiment of the agricultural header 106 that may be used within the agricultural harvester of FIG. 1. As discussed above, the agricultural header 106 includes a center section 126 configured to couple to the feeder house plate. In the illustrated embodiment, a frame 128 of the center section 126 is coupled to the feeder house plate. Moreover, the agricultural header 106 includes wings 130. In the illustrated embodiment, the agricultural header 106 includes a left wing 132 and a right wing 134. Each wing 130 is configured to move (e.g., rotate) with respect to the center section 126. The agricultural header 106 includes a wing actuator configured to move the wings 130 in response to input from a wing controller. In some embodiments, the wings are configured to move independently of each other. For example, the left wing 132 may lift with respect to the center section 126 and the right wing 134 may concurrently lower with respect to the center section 126 (e.g., to substantially match the contours of a field). To move the wings independently of each other, the agricultural header 106 may include a left wing actuator configured to move the left wing 132 and a right wing actuator configured to move the right wing 134.

In the illustrated embodiment, each wing 130 is rotatably coupled to the center section 126 of the agricultural header 106 via at least one rotatable joint 136. The at least one rotatable joint may include a hinge joint, a ball joint, etc. Each wing actuator may be configured to drive the respective wing 130 to rotate about the at least one rotatable joint with respect to the center section 126 of the agricultural header 106. For example, each wing actuator may include a cylinder body, a piston disposed within the cylinder body, and a rod extending from the piston. The rod may extend and retract with respect to the cylinder body in response to fluid flow to the wing actuator. The rod may be coupled to a portion of the respective wing 130, and the cylinder body may be coupled to a portion of the center section 126. The at least one wing actuator may be positioned such that extension and retraction of the rod with respect to the cylinder body causes the wing 130 to rotate about the at least one rotatable joint with respect to the center section 126. Rotating the wing 130 with respect to the center section 126 may cause the wing 130 to lift or lower with respect to a ground surface.

As discussed above, the agricultural header 106 (e.g., draper header) is configured to cut agricultural crops and direct the cut crops toward an inlet of the crop processing system. In some embodiments, the agricultural header 106 includes a cutter bar assembly 136 disposed on a front portion 138 of the agricultural header 106, opposite the work vehicle 100. The cutter bar assembly 136 may extend along a width 140 of the front portion of the agricultural header 106. For example, the cutter bar assembly 136 may extend from a distal end of the left wing 132 to a distal end of the right wing 134.

Further, in the illustrated embodiment, the agricultural header 106 includes a conveyor system. The portions of the crops that are cut by the cutter bar assembly 136 may be directed onto a respective conveyor of the agricultural header 106 by a reel assembly. The conveyor system includes a conveyor disposed on each wing 130. As illustrated, the left wing 132 has a left conveyor 146, and the right wing 134 has a right conveyor 148. Each of the left conveyor 146 and the right conveyor 148 may be configured to direct crops toward the center section 126. The center section 126 has a center section conveyor 150 configured to direct crops toward an inlet of the feeder house 104 leading to the processing system. However, in another embodiment, the agricultural header may include an auger system, including an auger that extends across the width of the agricultural header 106 between a left side portion and a right side portion of the agricultural header 106. The auger may direct the harvested crop material toward the inlet of the feeder house.

Figure 3:
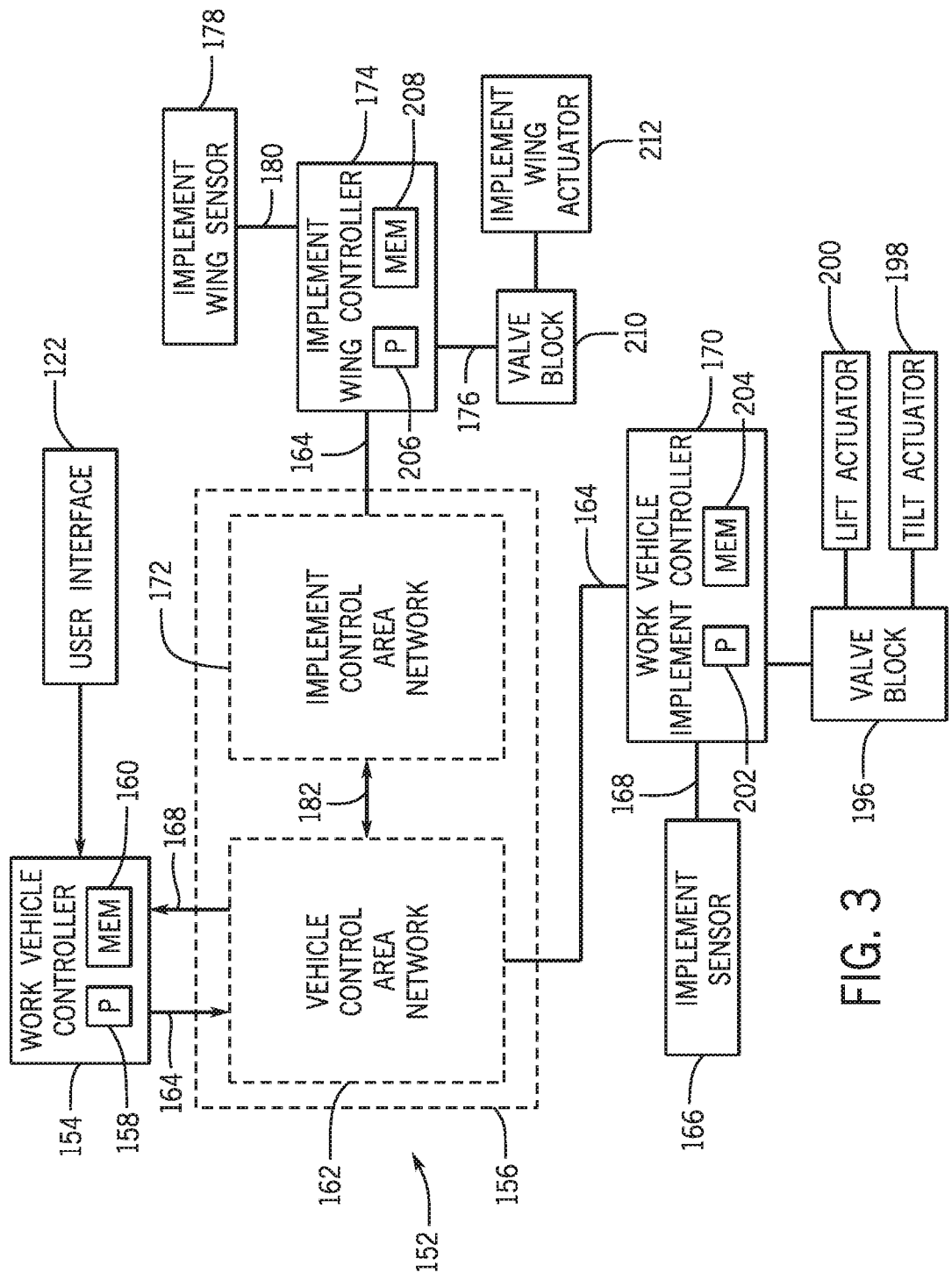
FIG. 3 is a block diagram of an embodiment of a control system for the agricultural harvester.

FIG. 3 is a block diagram of an embodiment of a control system 152 for the agricultural harvester. In the illustrated embodiment, the control system 152 includes a work vehicle controller 154 in communication with a network 156. The work vehicle controller 154 includes a processor 158, such as the illustrated microprocessor, and a memory device 160. The work vehicle controller 154 may also include one or more storage devices and/or other suitable components. Moreover, the processor 158 may include multiple microprocessors, one or more "general-purpose" microprocessors, one or more special-purpose microprocessors, and/or one or more application specific integrated circuits (ASICS), or some combination thereof. For example, the processor 158 may include one or more reduced instruction set (RISC) processors.

The memory device 160 may include a volatile memory, such as random access memory (RAM), and/or a nonvolatile memory, such as read-only memory (ROM). The memory device 160 may store a variety of information and may be used for various purposes. For example, the memory device 160 may store processor-executable instructions (e.g., firmware or software) for the processor 158 to execute. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware), and any other suitable data.

Moreover, the network includes a vehicle control area network 162. The work vehicle controller 154 may be in direct communication with the vehicle control area network 162. The work vehicle controller 154 is configured to output control signals 164 based at least in part on at least one header parameter. In some embodiments, the work vehicle controller may determine the at least one header parameter based on a yield map of the field, a terrain map of the field, or another suitable source. In another embodiment, the user may input the at least one header parameter via the user interface 122. The at least one header parameter may include a target cutting height for the agricultural header 106, sensitivity for the agricultural header, etc. In some embodiments, the work vehicle controller 154 is configured to output the control signals 164 based on a header condition at the center section of the agricultural header 106. In another embodiment, the work vehicle controller is configured to output the control signals 164 based on the header condition along the width of the header. In the illustrated embodiment, the control system 152 includes a header sensor 166 configured to output a signal indicative of the header condition at the center section 126 of the agricultural header 106 to the work vehicle controller 154 via the network. For example, the implement condition at the center section may include a current cutting height of the agricultural header 106. The work vehicle controller 154 may determine the current cutting height of the agricultural header 106 based on the received header condition signal 168. The work vehicle controller 154 may receive the at least one header parameter indicating the target cutting height for the agricultural header 106. The control signals 164 may include instructions to lift or lower the agricultural header 106 such that the agricultural header 106 moves from the current cutting height to the target cutting height for the agricultural header 106. Further, the work vehicle controller 154 is configured to output the control signals 164 to the vehicle control area network 162.

The control system 152 also includes an agricultural header controller 170 having a processor 202 and a memory device 204. The agricultural header controller 170 may be in communication with the network 156. In the illustrated embodiment, the network 156 includes a header control area network 172. The agricultural header controller 170 is in direct communication with the header control area network 172. The header control area network 172 may be linked to the vehicle control area network 162. In some embodiments, the vehicle control area network 162 includes a vehicle Controller Area Network Binary Unit System "CANBUS", the header control area network 172 includes a header CANBUS, and the vehicle CANBUS is communicatively coupled to the header CANBUS via an International Standardization Organization Binary Unit System "ISO-BUS" 182. The vehicle CANBUS may be communicatively coupled to the header CANBUS during installation of the agricultural header to the work vehicle. Coupling the vehicle CANBUS to the header CANBUS may include a physical coupling of network communication lines (e.g., network cables). Moreover, the agricultural header controller 170 is configured to receive the control signal 164 from the work vehicle controller 154 via the network 156. The agricultural header controller 170 is configured to control movement of the agricultural header based at least in part on the control signal 164. In some embodiments, the control signal 164 includes a target cutting height. The agricultural header controller 170 may control the header position based on the control signal to move the agricultural header to the target cutting height: or within a threshold range of the target cutting height. The threshold range of the target cutting height may be an acceptable range of heights for the agricultural header based on the target cutting height. For example, the threshold range may span between two inches below the target cutting height and two inches above the target cutting height.

In other embodiments, the agricultural header controller 170 may be in direct communication with the vehicle control area network 162. In some embodiments, the agricultural header controller 170 is configured to instruct the actuator assembly to control a height and/or tilt of the feeder house base in response to receiving the control signal 164 from the work vehicle controller 154 over the vehicle control area network 162. In some embodiments, the work vehicle controller 154 is configured to instruct the actuator assembly to control a height and/or tilt of the feeder house directly. The actuator assembly may include a header valve block 196, a tilt actuator 198, and lift actuator 200. The valve block 196 controls hydraulic fluid flow from a fluid source to a tilt actuator 198 to tilt the feeder house and/or to a lift actuator 200 to lift or lower the feeder house.

The control system 152 also includes a wing controller 174 having a processor 206 and a memory device 208. The wing controller is 174 in communication with the network 156. The wing controller 174 is in direct communication with the header control area network 172. However, the agricultural header controller 170, the work vehicle controller 154, and the wing controller 174 may be connected to one another via any suitable type of network. The network may be a wireless network (e.g., cloud based, WLAN, etc.).

The wing controller 174 is configured to control movement of each wing based at least in part on the control signal 164 output from the work vehicle controller 154. In some embodiments, the control signal 164 includes the at least one header parameter, and the wing controller 174 is configured to control movement of each wing based at least in part on the at least one header parameter received from the control signal 164. In another embodiment, the work vehicle controller 154 outputs the at least one header parameter to the network 156. In other embodiments, the user interface 122 outputs the at least one header parameter to the network 156. As discussed above, the work vehicle controller 154 outputs the control signals 164 to the network 156. The control signals 164 are configured to control movement of the agricultural header. The control signals 164 are configured to control movement generally for a single segment agricultural header; however, the control signals 164 are configured to control the center section of the agricultural header 106 for a multi-segment header. Therefore, the control signal 164 includes instructions for the agricultural header controller 170 to move the agricultural header 106. The control signals 164 to the agricultural header controller 170 are output to the network 156. Therefore, the wing controller 174 has access to the control signals 164 via the network 156. The wing controller 174 is configured receive the control signal 164 and to determine the at least one header parameter based on the inputted control signals 164. Further, the wing controller 174 is configured to output a wing control signal 176 based at least in part on the at least one header parameter. The wing control signal 176 may be indicative of instructions to move the wing 130 with respect to the center section. In some embodiments, the wing controller 174 is configured to control movement of each wing based at least in part on the at least one header parameter received from the network 156. The wing controller 174 is configured to instruct a wing valve block 210 to control movement of the wing with respect to the center section based at least in part on the at least one header parameter. The wing valve block 210 may control hydraulic fluid flow from a fluid source to a wing actuator 212 to control movement of the wing with respect to the center section.

In some embodiments, the wing controller 174 is configured to output a respective wing control signal for each wing of the agricultural header. For example, the plurality of wing control signals may include a left wing control signal configured to instruct movement of the left wing and a right wing control signal configured to instruct movement of the right wing. In some embodiments, the control system 152 includes a left wing controller and a right wing controller. The left wing controller may be configured output the wing control signal 176 based on the at least one header parameter and a left wing condition at the left wing. The right wing controller may be configured to output a right wing control signal based at least in part on a right wing condition at the right wing and the at least one header parameter. That is, the left wing controller and the right wing controller may be configured to output the left wing control signal and the right wing control signal, respectively, to control the left and right wings.

In some embodiments, the control system includes a wing sensor 178 (e.g., coupled to the wing) configured to determine the wing condition (e.g., a height of the wing, an angle of the wing with respect to the center section, a pressure that the weight of the wing exerts on the work surface, a velocity or acceleration of the wing, and a slope of the wing frame with respect to the ground) and to output a wing condition signal 180 to the wing controller 174 via the network 156. In some embodiments, the wing includes a drag arm coupled to a rotation sensor. The rotation sensor is configured to detect a height of the wing with respect to a work surface based on rotation of the drag arm with respect to the wing. The drag arm may rotate due to changes in distance between the wing and the work surface. In some embodiments, the wing sensor includes a laser, an ultrasonic sensor, a radar sensor, or another suitable sensor, or a combination thereof, configured to detect a height of the wing with respect to the work surface. Moreover, the wing sensor 178 is configured to output the wing condition signal 180 to the network 156. For example, the wing sensor 178 may be configured to output the wing condition signal 180 to the header control area network 172. Further, the wing controller 174 is configured to output a wing control signal 176 indicative of instructions to move the wing based at least in part on the control signal 164, having the at least one header parameter, and the wing condition signal 180.

In some embodiments, the control system 152 includes multiple wing sensors. The wing sensors may be disposed along the width of each wing 130. Having multiple wing sensors may provide the wing controller with more data points to determine the wing condition. In certain embodiments, the control system includes a second wing sensor configured to output a second wing condition signal indicative of a second wing condition at a second wing to the wing controller 174.

FIG. 4 is a front view of an embodiment of the agricultural header 106 having the center section 126, the left wing 132, and the right wing 134. As discussed above, the work vehicle controller is configured to output the control signal based at least in part on the header condition at the center section 126 of the agricultural header 106. The control signal includes instructions to move (e.g., lift, lower, tilt) the center section 126 of the agricultural header 106. For example, the condition signal may indicate a slope 188 in the work surface 190 at the center section 126 of the agricultural header 106. The work surface 190 is higher at a right side 184 of the center section 126 than at the left side 186 of the center section 126. The work vehicle controller may receive the header condition signal and output the control signal to tilt the center section 126 such that the right side 184 of center section 126 lifts and the right side 186 of the center section 126 lowers. Tilting the center section 126 may maintain a generally consistent cutting height of the agricultural header 106 along the center section 126. The wings 130 may be coupled to the center section such that rotation of the center section moves the wings with respect to the work surface 190. The wing sensor may output the implement wing condition signal indicating a change in a height of the wing such that the wing controller may output the control signal having instructions to move the wings 130 to maintain the generally consistent cutting height.

FIG. 5 is a front view of the agricultural header, in which the left wing 132 is lowered. In some embodiments, the wing controller is configured to output the wing control signal based on a wing condition at the wing 130 and the at least one header parameter from the control signal. For example, the work vehicle controller may output a control signal indicative of instructions to position the center section 126 at a target cutting height 192 above the work surface 190. Due to a slope in the work surface 190, the wing controller may determine that a current height of the left wing 132 with respect to the work surface 190 is higher than the target cutting height 192. The wing controller, based on the wing condition and the at least one header parameter from the control signal, outputs the wing control signal to lower the left wing 132 to the target cutting height 192 with respect to the work surface 190.

In some embodiments, the control system is configured to move both the right wing 134 and the left wing 132 with respect to the center section 126. In another embodiment, the center section 126, the left wing, and the right wing each move with respect to the work vehicle 100 according to the at least one parameter (e.g., target cutting height, sensitivity, etc.). For example, the control system may be configured to rotate the left wing 132 and the right wing 134 upward with respect to the center section based at least in part on the a change in the work surface resulting in the wings 130 falling below the target cutting height. In a further embodiment, the control system may cause any combination of movement or non-movement of the center section 126, left wing, and right wing to position each of the portion of the agricultural header 106.

Figure 6:
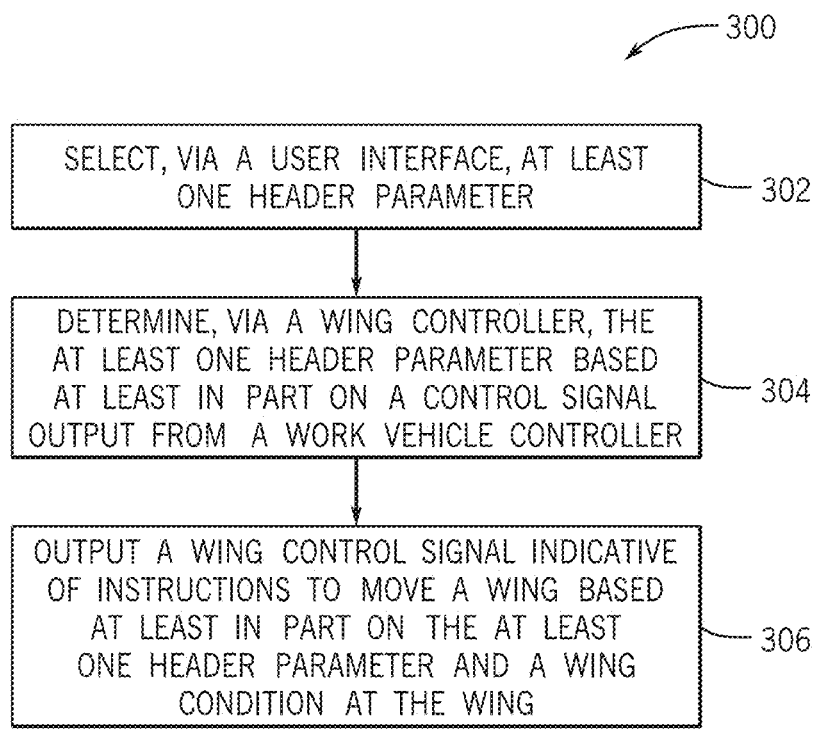
FIG. 6 is a flowchart of an embodiment of a method to control the agricultural header.

FIG. 6 is a flowchart of an embodiment of a method 300 to control the agricultural header. The method 300 includes the step 302 of selecting, via a user interface, at least one header parameter. The at least one header parameter may include a target cutting height, a sensitivity, etc. The sensitivity includes the speed and magnitude of movement of the agricultural header and/or the wings in response to the control signal. Further, a work vehicle controller may be configured to output a control signal to a control area network based at least in part on the at least one header parameter. The control signal may be indicative of instructions to control movement of the agricultural header. In some embodiments, the control signal may include the at least one header parameter.

The method also includes the step 304 of determining, e.g., via a wing controller, the at least one header parameter based at least in part on a control signal, e.g., output from a work vehicle controller. The wing controller may be connected to the control area network and configured to receive the control signal from the network. In some embodiments, the work vehicle controller determines the at least one header parameter and outputs the at least one header parameter to the network. In another embodiment, the user interface may output the at least one header parameter to the network. The wing controller may receive the at least one header parameter from the network.

The method further includes the step 306 of outputting a wing control signal indicative of instructions to move a wing based at least in part on the at least one parameter and a wing condition at the wing. As discussed above, the at least one header parameter may include a cutting height for the agricultural header. Thus, in one embodiment, the wing controller may output the wing control signal indicative of instructions to lift the wing when the work surface is elevated at the wing or lower the wing when the work surface is depressed with at the wing.

In some embodiments, the method further includes the step of determining the at least one header parameter based at least in part on a header condition signal output from a header sensor. The header sensor may be configured to output the header condition signal to the work vehicle controller via the control area network. The wing controller may determine the at least one parameter based at least in part on header condition signal and the at least one header parameter from the control signal.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function]", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural harvester, comprising:
a work vehicle controller configured to output a control signal indicative of instructions to move a feeder house of the agricultural harvester based at least in part on at least one header parameter and a header condition at a center section of an agricultural header, wherein the header condition comprises a current cutting height of the center section of the agricultural header, the at least one header parameter comprises a target cutting height of the agricultural header, and the work vehicle controller is configured to output the control signal to a network;
a header sensor configured to output a header condition signal indicative of the header condition at the center section of the agricultural header to the work vehicle controller via the network;
an agricultural header controller configured to:
receive the control signal; and
control movement of the feeder house based at least in part on the control signal to control movement of the agricultural header; and
a wing controller configured to:
receive the header condition signal from the network;
determine the at least one header parameter based at least in part on the header condition; and
output a wing control signal indicative of instructions to move a wing based at least in part on the at least one header parameter, wherein the wing is coupled to the center section of the agricultural header.

2. The agricultural harvester of claim 1, wherein the network comprises a Controller Area Network Binary Unit System (CANBUS).

3. The agricultural harvester of claim 1, wherein the at least one header parameter comprises a sensitivity.

4. The agricultural harvester of claim 1, further comprising a user interface configured to select a value for the at least one header parameter and output the at least one header parameter to the work vehicle controller.

5. The agricultural harvester of claim 1, wherein the control signal is configured to adjust a height, a tilt, or a combination thereof, of the feeder house.

6. The agricultural harvester of claim 1, wherein the wing controller is further configured to determine the at least one header parameter based at least in part on the control signal and the header condition.

7. The agricultural harvester of claim 1, wherein the wing controller is configured to output the wing control signal indicative of instructions to move the wing based at least in part on a wing condition at the wing.

8. The agricultural harvester of claim 1, further comprising a wing sensor configured to detect a wing condition at the wing and output a wing condition signal indicative of the wing condition to the wing controller.

9. The agricultural harvester of claim 8, further comprising a second wing sensor configured to detect a second wing condition at a second wing and output a second wing condition signal indicative of the second wing condition to the wing controller.

10. The agricultural harvester of claim 1, wherein the work vehicle controller is further configured to receive the at least one header parameter from the network.

11. A work vehicle system, comprising:
a work vehicle comprising a feeder house control block in communication with a vehicle control area network, the feeder house control block configured to move a feeder house in response to a control signal;
an agricultural header coupled to the work vehicle via the feeder house, the agricultural header comprising a center section, a left wing, and a right wing, wherein the left wing and the right wing are coupled to opposite sides of the center section of the agricultural header;
a work vehicle controller in communication with the vehicle control area network, the work vehicle controller configured to:
generate the control signal to cause the feeder house to move the center section of the agricultural header based at least in part on a header condition at the center section of the agricultural header and at least one header parameter, wherein the header condition comprises a current cutting height of the center section of the agricultural header, and the at least one header parameter comprises a target cutting height of the agricultural header; and
output the control signal to the vehicle control area network;
a header sensor configured to output a header condition signal indicative of the header condition at the center section of the agricultural header to the work vehicle controller via the vehicle control area network;
a wing controller in communication with a header control area network linked to the vehicle control area network, the wing controller configured to:
receive the header condition signal from the header control area network;
determine the at least one header parameter based at least in part on the header condition;
generate a left wing control signal configured to move the left wing based at least in part on a left wing condition at the left wing and the at least one parameter;
generate a right wing control signal configured to move the right wing based at least in part on a right wing condition at the right wing and the at least one parameter; and
output the left wing control signal and the right wing control signal.

12. The work vehicle system of claim 11, further comprising at least one actuator configured to move the feeder house with respect to the work vehicle in response to a communication from the control block, wherein the at least one actuator is a hydraulic, pneumatic, or electric actuator.

13. The work vehicle system of claim 11, further comprising:
a left wing actuator configured to move the left wing with respect to the center section of the agricultural header in response to a left communication from a wing control block, wherein the wing control block is configured to receive the left wing control signal and output a left wing control communication based at least in part on the left wing control signal; and
a right wing actuator configured to move the right wing with respect to the center section of the agricultural header in response to a right communication from the wing control block, wherein the wing control block is configured to receive the right wing control signal and output a right wing control communication based at least in part on the right wing control signal.

14. The work vehicle system of claim 13, wherein the left wing is coupled to the center section of the agricultural header via at least one left rotatable joint, the left wing actuator is configured to move a free end of the left wing to rotate the left wing with respect to the center section of the agricultural header, the right wing is coupled to the center section of the agricultural header via at least one right rotatable joint, and the right wing actuator is configured to move a free end of the right wing to rotate the right wing with respect to the center section of the agricultural header.

15. The work vehicle system of claim 11, wherein the left wing and the right wing each comprise a respective conveyor, wherein each respective conveyor is configured to move a top surface of each respective conveyor in a direction toward the center section of the agricultural header.

16. The work vehicle system of claim 11, wherein the agricultural header further comprises a cutting edge extending from a free end of the left wing to a free end of the right wing, and wherein the cutting edge is disposed on a front portion of the agricultural header, opposite the work vehicle.

17. The work vehicle system of claim 11, wherein the wing controller is further configured to determine the at least one header parameter based at least in part on the control signal and the header condition.

18. The work vehicle system of claim 11, wherein the at least one header parameter comprises a sensitivity.

\* \* \* \* \*